US009253784B2

(12) United States Patent
Liu et al.

(10) Patent No.: US 9,253,784 B2
(45) Date of Patent: Feb. 2, 2016

(54) METHOD AND SYSTEM FOR ENABLING RESOURCE BLOCK BUNDLING IN LTE-A SYSTEMS

(75) Inventors: Lingjia Liu, Allen, TX (US);
Young-Han Nam, Plano, TX (US);
Jianzhong Zhang, Irving, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 764 days.

(21) Appl. No.: 12/970,717

(22) Filed: Dec. 16, 2010

(65) Prior Publication Data
US 2011/0170498 A1 Jul. 14, 2011

Related U.S. Application Data

(60) Provisional application No. 61/294,010, filed on Jan. 11, 2010.

(51) Int. Cl.
*H04W 72/04* (2009.01)
*H04W 72/06* (2009.01)
*H04L 25/03* (2006.01)
*H04B 7/04* (2006.01)
*H04L 5/00* (2006.01)

(52) U.S. Cl.
CPC ............ *H04W 72/06* (2013.01); *H04B 7/0478* (2013.01); *H04L 5/0053* (2013.01); *H04L 25/03343* (2013.01); *H04L 5/0044* (2013.01)

(58) Field of Classification Search
CPC ............ H04W 72/04; H04W 72/0406; H04W 72/042; H04W 72/06; H04W 72/0453; H04W 72/0446; H04L 1/02; H04L 1/0001; H04B 7/063; H04B 7/0632; H04B 7/0486
See application file for complete search history.

(56) References Cited

U.S. PATENT DOCUMENTS

| 8,385,239 | B2 * | 2/2013 | Golitschek Edler von Elbwart et al. ............... 370/310 |
| 2007/0217540 | A1 * | 9/2007 | Onggosanusi et al. ....... 375/267 |
| 2008/0260059 | A1 | 10/2008 | Pan |
| 2009/0080549 | A1 | 3/2009 | Khan et al. |
| 2010/0271970 | A1 * | 10/2010 | Pan et al. ...................... 370/252 |

(Continued)

FOREIGN PATENT DOCUMENTS

| EP | 2 117 155 A1 | 11/2009 |
| RU | 2369966 C1 | 10/2009 |
| WO | WO 2007/130808 A2 | 11/2007 |

(Continued)

OTHER PUBLICATIONS

3GPP TS 36.213 V8.3.0 (May 2008) whole document.*

(Continued)

*Primary Examiner* — Chirag Shah
*Assistant Examiner* — Srinivasa Reddivalam

(57) ABSTRACT

A base station is provided. The base station includes a transmit path circuitry to transmit an indication of whether a subscriber station is configured with precoding matrix indicator/rank indicator (PMI/RI) reporting. The transmit path circuitry sets a pre-coding granularity to multiple physical resource blocks in the frequency domain to perform a same pre-coding over a bundled resource block if the subscriber station is configured with PMI/RI reporting. The bundled resource block includes multiple consecutive physical resource blocks in the frequency domain. The base station also includes a receive path circuitry to receive feedback from the subscriber station.

23 Claims, 14 Drawing Sheets

(56) References Cited

U.S. PATENT DOCUMENTS

2011/0105137 A1* 5/2011 Gaal et al. .................. 455/452.1
2013/0016694 A1* 1/2013 Nimbalker et al. ........... 370/330

FOREIGN PATENT DOCUMENTS

| WO | WO 2008/131352 A1 | 10/2008 |
|---|---|---|
| WO | WO 2009/116760 A2 | 9/2009 |
| WO | WO 2009/157709 A2 | 12/2009 |

OTHER PUBLICATIONS

Matthew Baker, 3GPP LTE-Advanced Physical Layer, Dec. 2009, REV-090003r1, all pages.*
International Search Report dated Aug. 29, 2011 in connection with International Patent Application No. PCT/KR2011/000062.
"Impact of the PMI/RI Report Drop on the PUCCH CQI Report", Sharp, 3GPP TSG RAN WG1 Meeting #53bis, Jun. 30-Jul. 4, 2008, 4 pages.
"LS on enhanced dual-layer transmission", 3GPP TSG RAN WG1 Meeting #59, Nov. 9-13, 2009, 2 pages.
"UE-RS Patterns for ranks 5 to 8 of LTE-A", Qualcomm Europe, 3GPP TSG-RAN WG1 Meeting #58bis, Oct. 12-16, 2009, 10 pages.
"Discussion on DM-RS for LTE-Advanced", Samsung, 3GPP TSG RAN WG1 Meeting #58bis, Oct. 12-16, 2009, 4 pages.
"Downlink DM-RS Design Considerations for Rank 5-8 in LTE-A", Research in Motion, UK Limted, 3GPP TSG RAN WG1 Meeting #59, Nov. 9-13, 2009, 6 pages.
European Search Report dated Oct. 29, 2013 in connection with European Patent Application No. 11150088.0; 7 pages.
3GPP TSG RAN WG1 Meeting #58; "Discussion on precoding granularity for downlink MIMO"; CATT; Shenzhen, China; Aug. 24-28, 2009; 4 pages.
3GPP TSG-RAN WG1 #58; UE-RS Patterns for LTE-A; Qualcomm Europe; Shenzhen, China; Aug. 24-28, 2009; 9 pages.
Extended European Search Report dated Jul. 3, 2014 in connection with European Patent Application No. 14171879.1; 7 pages.
Texas Instruments, "Uplink SU-MIMO for E-UTRA", 3GPP TSG RAN WG1 53 bs, Warsaw, Poland, Jun. 30-Jul. 4, 2008, 6 pages.
Translated Russian Decision on Grant dated Jan. 12, 2015 in connection with Russian Patent Application No. 2012124082/07(036798); 17 pages.
Japanese Notice of Allowance dated Feb. 9, 2015 in connection with Japanese Patent Application 2012-548877; 6 pages.
3GPP TSG RAN WG1 meeting #59; "DMRS discussion for rank 5-8"; R1-094705; Jeju, Korea; Nov. 9-13, 2009; 4 pages.
Translated Japanese Office Action dated Jun. 29, 2015 in connection with Japanese Patent Application No. 2014-172400; 5 pages.
3GPP TSG RAN WG1 #59bis; "Discussion on RB Bundling for DM-RS"; R1-100104; Valencia, Spain; Jan. 18-22, 2010; 4 pages.

* cited by examiner

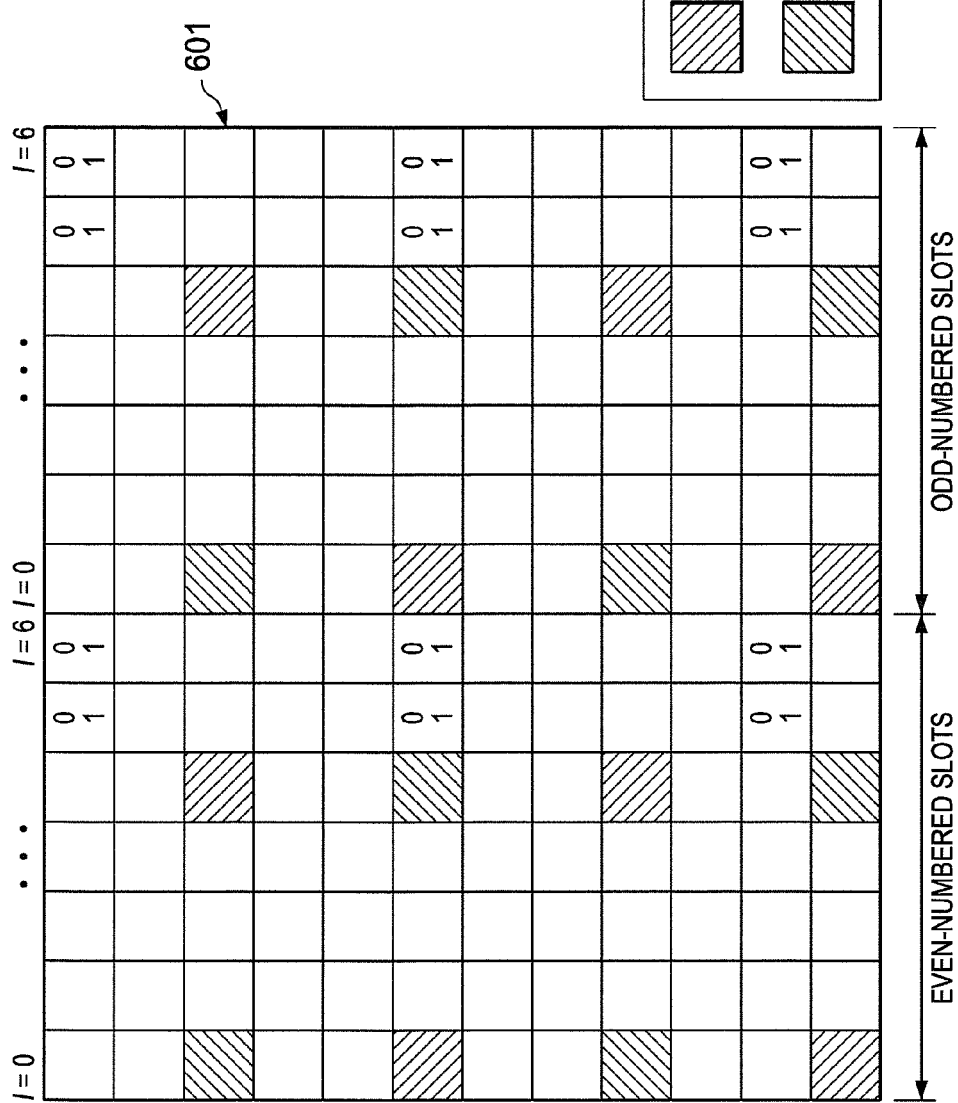

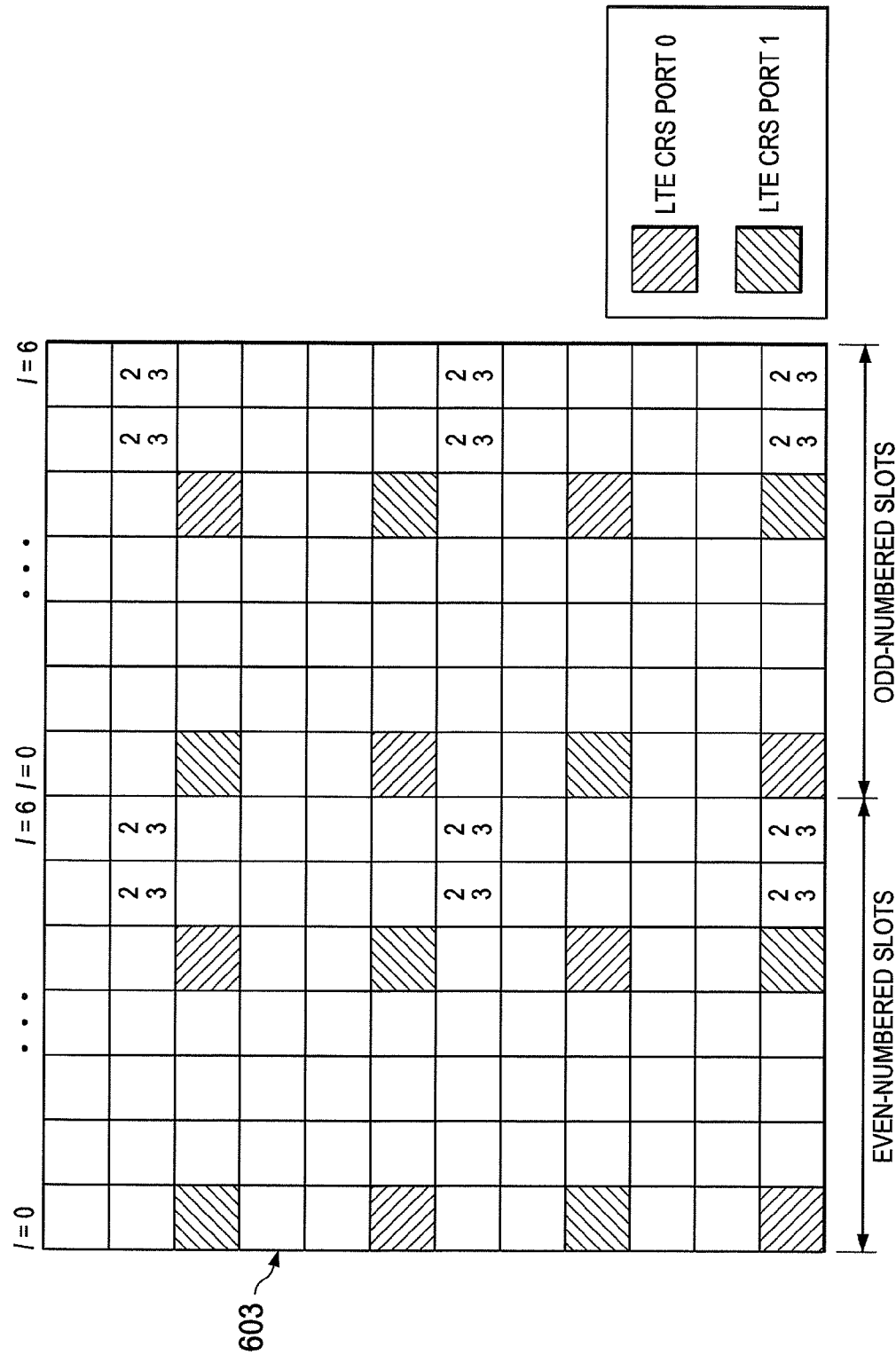

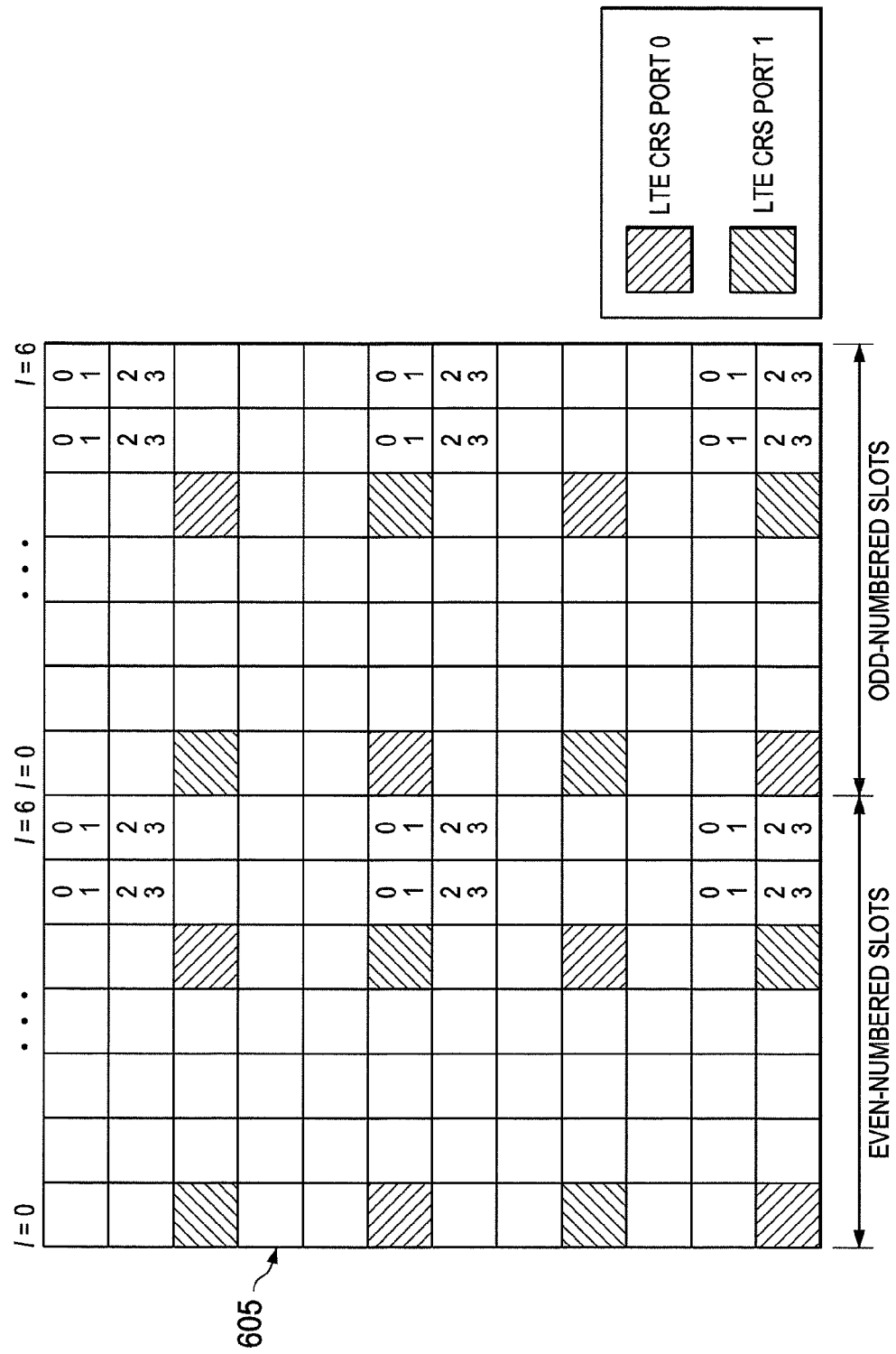

FIG. 8
| STATES | RB ON/OFF BITS | INTERPRETATION AT UE |
|---|---|---|
| 1 | 0 | RB-BUNDLING OFF |
| 2 | 1 | RB-BUNDLING ON |
FIG. 9
| STATES | INTERPRETATION AT UE |
|---|---|
| 1 | RB-BUNDLING ON |
| 2 | RB-BUNDLING OFF |
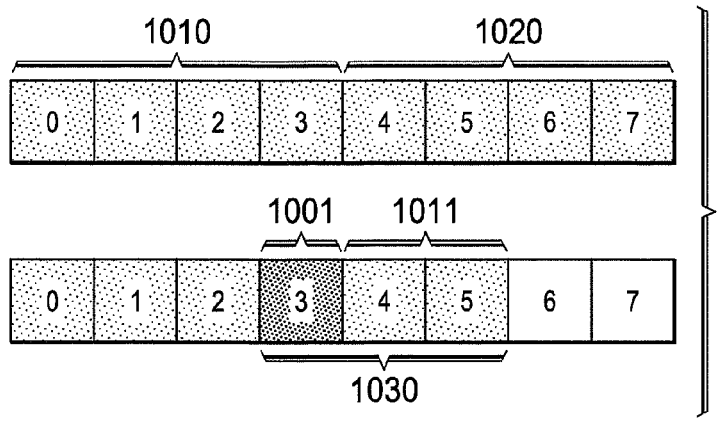
FIG. 10
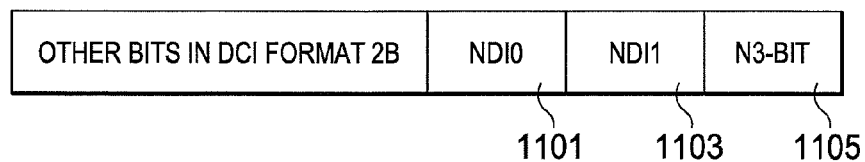
FIG. 11

| | RANK-2 PATTERN A | RANK-2 PATTERN B | RANK-4 PATTERN | RANK-8 PATTERN A OR B |
|---|---|---|---|---|
| RESTRICTED SUBSET A | {0}, {1}, {0,1} | {2}, {3}, {2,3} | {0}, {1}, {2}, {3}, {1,2,3} {0,1,2,3} | {4,5,6,7,8} {4,5,6,7,8,9} {4,5,6,7,8,9,10} {4,5,6,7,8,9,10,11} |

| NDI BIT OF A DISABLED TB, IF ANY | SELECTED BITS IN THE NEW 3-BIT FIELD | INDICATED DM RS INDEX SET |
|---|---|---|
| 0 | 000 | {0} IN THE RANK-4 PATTERN |
| 1 | 000 | {1} IN THE RANK-4 PATTERN |
| 0 | 001 | {2} IN THE RANK-4 PATTERN |
| 1 | 001 | {3} IN THE RANK-4 PATTERN |
| 0 | 010 | {0} IN THE RANK-2 PATTERN A |
| 1 | 010 | {1} IN THE RANK-2 PATTERN A |
| 0 | 011 | {2} IN THE RANK-2 PATTERN B |
| 1 | 011 | {3} IN THE RANK-2 PATTERN B |
| NO DISABLED TBs | 000 | {0,1} IN THE RANK-2 PATTERN A |
| NO DISABLED TBs | 001 | {2,3} IN THE RANK-2 PATTERN B |
| NO DISABLED TBs | 010 | {1,2,3} IN THE RANK-4 PATTERN |
| NO DISABLED TBs | 011 | {0,1,2,3} IN THE RANK-4 PATTERN |
| NO DISABLED TBs | 100 | {4,5,6,7,8} IN THE RANK-4 PATTERN |
| NO DISABLED TBs | 101 | {4,5,6,7,8,9} IN THE RANK-4 PATTERN |
| NO DISABLED TBs | 110 | {4,5,6,7,8,9,10} IN THE RANK-4 PATTERN |
| NO DISABLED TBs | 111 | {4,5,6,7,8,9,10,11} IN THE RANK-4 PATTERN |

| | RANK-2 PATTERN A | RANK-2 PATTERN B | RANK-4 PATTERN | RANK-8 PATTERN A OR B |
|---|---|---|---|---|
| RESTRICTED SUBSET B | {0}, {1} | {2}, {3} | {0}, {1}, {2}, {3},<br>{1,2}, {3,4}<br>{1,2,3}<br>{0,1,2,3} | {4,5,6,7,8}<br>{4,5,6,7,8,9}<br>{4,5,6,7,8,9,10}<br>{4,5,6,7,8,9,10,11} |

| NDI BIT OF A DISABLED TB, IF ANY | SELECTED BITS IN THE NEW 3-BIT FIELD | INDICATED DM RS INDEX SET |
|---|---|---|
| 0 | 000 | {0} IN THE RANK-4 PATTERN |
| 1 | 000 | {1} IN THE RANK-4 PATTERN |
| 0 | 001 | {2} IN THE RANK-4 PATTERN |
| 1 | 001 | {3} IN THE RANK-4 PATTERN |
| 0 | 010 | {0} IN THE RANK-2 PATTERN A |
| 1 | 010 | {1} IN THE RANK-2 PATTERN A |
| 0 | 011 | {2} IN THE RANK-2 PATTERN B |
| 1 | 011 | {3} IN THE RANK-2 PATTERN B |
| NO DISABLED TBs | 000 | {0,1} IN THE RANK-4 PATTERN |
| NO DISABLED TBs | 001 | {2,3} IN THE RANK-4 PATTERN |
| NO DISABLED TBs | 010 | {1,2,3} IN THE RANK-4 PATTERN |
| NO DISABLED TBs | 011 | {0,1,2,3} IN THE RANK-4 PATTERN |
| NO DISABLED TBs | 100 | {4,5,6,7,8} IN THE RANK-4 PATTERN |
| NO DISABLED TBs | 101 | {4,5,6,7,8,9} IN THE RANK-4 PATTERN |
| NO DISABLED TBs | 110 | {4,5,6,7,8,9,10} IN THE RANK-4 PATTERN |
| NO DISABLED TBs | 111 | {4,5,6,7,8,9,10,11} IN THE RANK-4 PATTERN |

METHOD AND SYSTEM FOR ENABLING RESOURCE BLOCK BUNDLING IN LTE-A SYSTEMS

CROSS-REFERENCE TO RELATED APPLICATION(S) AND CLAIM OF PRIORITY

The present application is related to U.S. Provisional Patent Application No. 61/294,010, filed Jan. 11, 2010, entitled "RESOURCE BLOCK BUNDLING FOR LTE-A SYSTEMS". Provisional Patent Application No. 61/294,010 is assigned to the assignee of the present application and is hereby incorporated by reference into the present application as if fully set forth herein. The present application hereby claims priority under 35 U.S.C.§119(e) to U.S. Provisional Patent Application No. 61/294,010.

TECHNICAL FIELD OF THE INVENTION

The present application relates generally to wireless communications and, more specifically, to a method and system for enabling resource block bundling.

BACKGROUND OF THE INVENTION

In $3^{rd}$ Generation Partnership Project Long Term Evolution (3GPP LTE), Orthogonal Frequency Division Multiplexing (OFDM) is adopted as a downlink (DL) transmission scheme.

SUMMARY OF THE INVENTION

A base station is provided. The base station includes a transmit path circuitry configured to transmit an indication of whether a subscriber station is configured with precoding matrix indicator/rank indicator (PMI/RI) reporting. The transmit path circuitry is configured to set a pre-coding granularity to multiple physical resource blocks in the frequency domain to perform a same pre-coding over a bundled resource block if the subscriber station is configured with PMI/RI reporting. The bundled resource block comprises multiple consecutive physical resource blocks in the frequency domain. The base station also includes a receive path circuitry configured to receive feedback from the subscriber station.

A method of operating a base station is provided. The method includes transmitting an indication of whether a subscriber station is configured with precoding matrix indicator/rank indicator (PMI/RI) reporting, and setting a pre-coding granularity to multiple physical resource blocks in the frequency domain to perform a same pre-coding over a bundled resource block if the subscriber station is configured with PMI/RI reporting. The bundled resource block comprises multiple consecutive physical resource blocks in the frequency domain. The method also includes receiving feedback from the subscriber station.

A subscriber station is provided. The subscriber station includes a receive path circuitry configured to receive from a base station an indication of whether the subscriber station is configured with precoding matrix indicator/rank indicator (PMI/RI) reporting, and perform a channel estimation over a bundled resource block if the subscriber station is configured with PMI/RI reporting. The bundled resource block comprises multiple consecutive physical resource blocks in the frequency domain. The subscriber station also includes a transmit path circuitry configured to transmit the channel estimation as feedback to the base station.

A method of operating a subscriber station is provided. The method includes receiving from a base station an indication of whether the subscriber station is configured with precoding matrix indicator/rank indicator (PMI/RI) reporting, and performing a channel estimation over a bundled resource block if the subscriber station is configured with PMI/RI reporting. The bundled resource block comprises multiple consecutive physical resource blocks in the frequency domain. The method also includes transmitting the channel estimation as feedback to the base station.

A base station is provided. The base station includes a transmit path circuitry configured to transmit an indication of either a first feedback mode or a second feedback mode to a subscriber station. The transmit path circuitry is also configured to set a pre-coding granularity to multiple physical resource blocks in the frequency domain to perform a same pre-coding over a bundled resource block if the first feedback mode is indicated by the indicator. The bundled resource block comprises multiple consecutive physical resource blocks in the frequency domain. The base station also includes a receive path circuitry configured to receive feedback from the subscriber station.

A method of operating a base station is provided. The method includes transmitting an indication of either a first feedback mode or a second feedback mode to a subscriber station and receiving feedback from the subscriber station, and setting a pre-coding granularity to multiple physical resource blocks in the frequency domain to perform a same pre-coding over a bundled resource block if the first feedback mode is indicated by the indicator. The bundled resource block comprises multiple consecutive physical resource blocks in the frequency domain. The method also includes receiving feedback from the subscriber station.

A subscriber station is provided. The subscriber station includes a receive path circuitry configured to receive an indication of either a first feedback mode or a second feedback mode from a base station, and perform a channel estimation over a bundled resource block if the first feedback mode is indicated by the indicator. The bundled resource block comprises multiple consecutive physical resource blocks in the frequency domain. The subscriber station also includes a transmit path circuitry configured to transmit the channel estimation as feedback to the base station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates dedicated reference signal (DRS) patterns that support two and four layer transmissions according to an embodiment of this disclosure;

FIG. 8 illustrates a table depicting the use of a one bit signaling to turn on or turn off resource block (RB) bundling according to an embodiment of this disclosure;

FIG. 9 illustrates a table depicting the use of available downlink control information (DCI) code-points to turn on or turn off resource block RB bundling according to an embodiment of this disclosure;

FIG. 10 illustrates subbands bundled together according to an embodiment of this disclosure;

FIG. 11 illustrates a DCI format 2C according to an embodiment of this disclosure;

FIG. 12 illustrates a table depicting restricted subsets according to an embodiment of this disclosure;

FIG. 13 illustrates a table depicting a mapping of states in a restricted subset to codepoints in DCI format 2C according to an embodiment of this disclosure;

FIG. 14 illustrates a table depicting restricted subsets according to another embodiment of this disclosure;

FIG. 15 illustrates a table depicting a mapping of states in a restricted subset to codepoints in DCI format 2C according to another embodiment of this disclosure;

DETAILED DESCRIPTION OF THE INVENTION

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the Long Term Evolution (LTE) term "node B" is another term for "base station" used below. Also, the LTE term "user equipment" or "UE" is another term for "subscriber station" used below.

Figure 1:
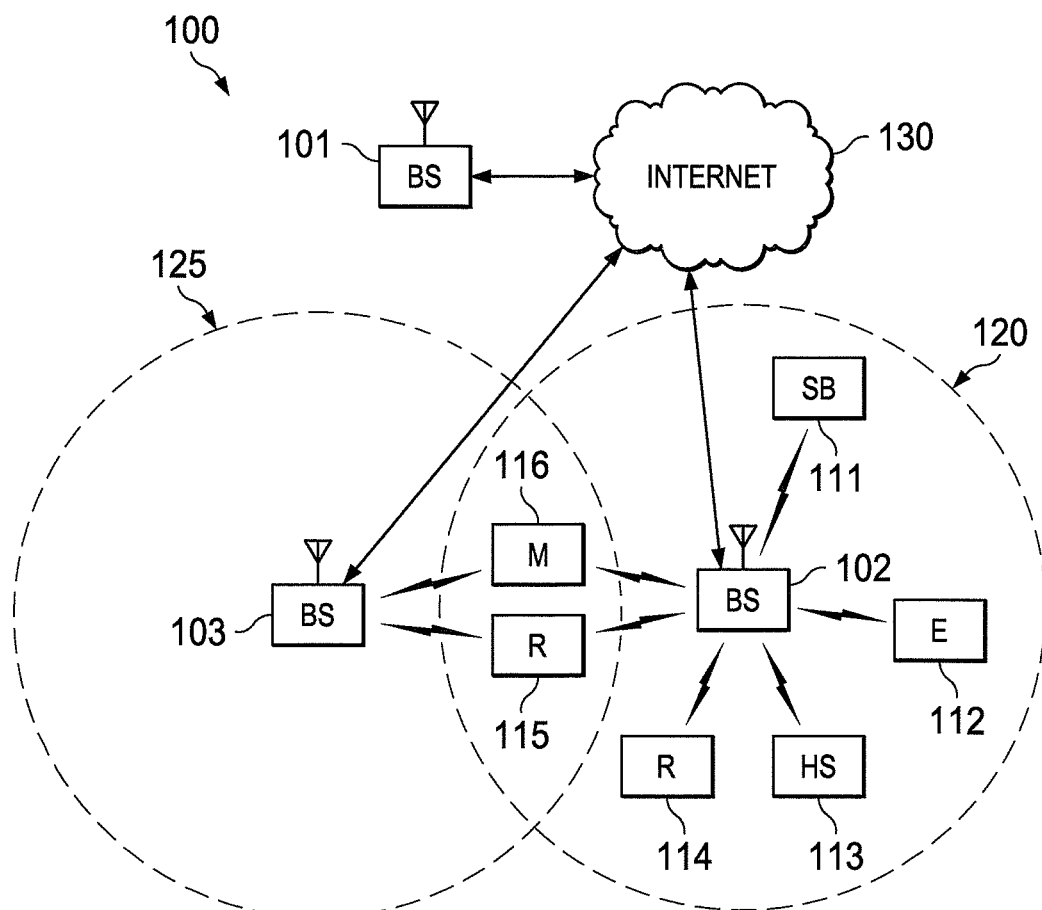
FIG. 1 illustrates an exemplary wireless network that transmits messages in the uplink according to the principles of this disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown).

Base station 101 is in communication with Internet 130 or a similar IP-based network (not shown).

Base station 102 provides wireless broadband access to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

While only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
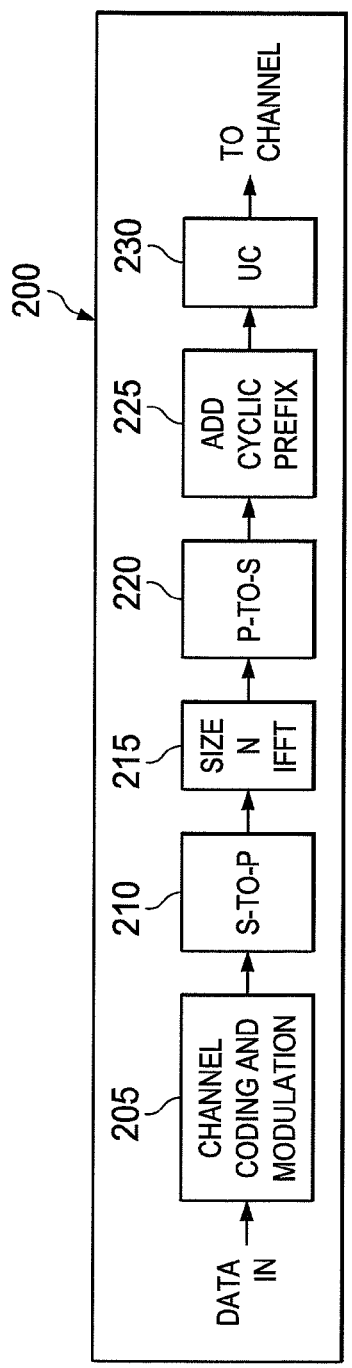
FIG. 2 is a high-level diagram of an orthogonal frequency division multiple access (OFDMA) transmitter according to one embodiment of this disclosure.
Figure 3:
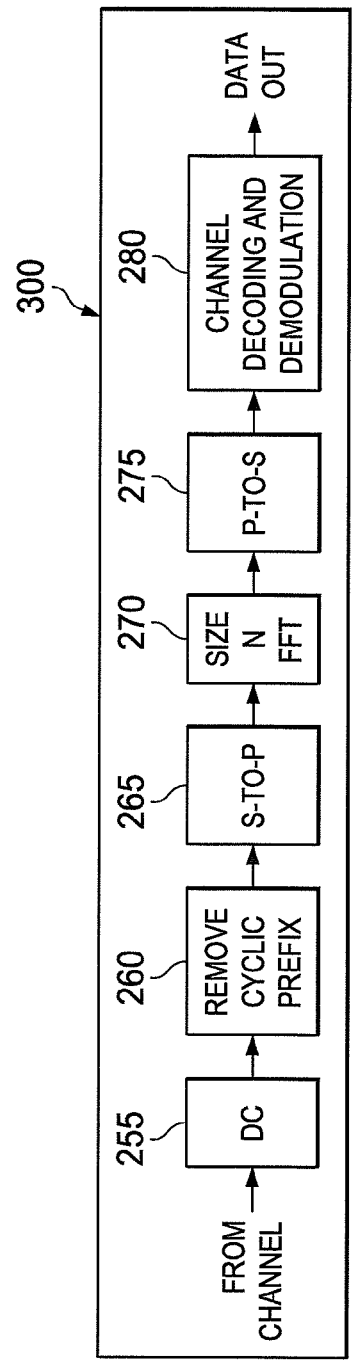
FIG. 3 is a high-level diagram of an OFDMA receiver according to one embodiment of this disclosure.

FIG. 2 is a high-level diagram of an orthogonal frequency division multiple access (OFDMA) transmit path 200. FIG. 3 is a high-level diagram of an orthogonal frequency division multiple access (OFDMA) receive path 300. In FIGS. 2 and 3, the OFDMA transmit path 200 is implemented in base station (BS) 102 and the OFDMA receive path 300 is implemented in subscriber station (SS) 116 for the purposes of illustration and explanation only. However, it will be understood by those skilled in the art that the OFDMA receive path 300 may also be implemented in BS 102 and the OFDMA transmit path 200 may be implemented in SS 116.

The transmit path 200 in BS 102 comprises a channel coding and modulation block 205, a serial-to-parallel (S-to-P) block 210, a Size N Inverse Fast Fourier Transform (IFFT) block 215, a parallel-to-serial (P-to-S) block 220, an add cyclic prefix block 225, an up-converter (UC) 230, a reference signal multiplexer 290, and a reference signal allocator 295.

The receive path 300 in SS 116 comprises a down-converter (DC) 255, a remove cyclic prefix block 260, a serialto-parallel (S-to-P) block 265, a Size N Fast Fourier Transform (FFT) block 270, a parallel-to-serial (P-to-S) block 275, and a channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that, for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency. In some embodiments, reference signal multiplexer 290 is operable to multiplex the reference signals using code division multiplexing (CDM) or time/frequency division multiplexing (TFDM). Reference signal allocator 295 is operable to dynamically allocate reference signals in an OFDM signal in accordance with the methods and system disclosed in the present disclosure.

The transmitted RF signal arrives at SS 116 after passing through the wireless channel and reverse operations performed at BS 102. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

The transmitted signal in each downlink (DL) slot of a resource block is described by a resource grid of $N_{RB}^{DL}N_{sc}^{RB}$ subcarriers and $N_{symb}^{DL}$ OFDM symbols. The quantity $N_{RB}^{DL}$ depends on the downlink transmission bandwidth configured in the cell and fulfills $N_{RB}^{min,DL} \leq N_{RB}^{DL} \leq N_{RB}^{max,DL}$, where $N_{RB}^{min,DL}$ and $N_{RB}^{max,DL}$ are the smallest and largest downlink bandwidth, respectively, supported. In some embodiments, subcarriers are considered the smallest elements that are capable of being modulated.

In case of multi-antenna transmission, there is one resource grid defined per antenna port.

Each element in the resource grid for antenna port p is called a resource element (RE) and is uniquely identified by the index pair (k,l) in a slot where $k=0, \ldots, N_{RB}^{DL}N_{sc}^{RB}-1$ and $l=0, \ldots, N_{symb}^{DL}-1$ are the indices in the frequency and time domains, respectively. Resource element (k,l) on antenna port p corresponds to the complex value $\alpha_{k,l}^{(p)}$. If there is no risk for confusion or no particular antenna port is specified, the index p may be dropped.

In LTE, DL reference signals (RSs) are used for two purposes. First, UEs measure channel quality information (CQI), rank information (RI) and precoder matrix information (PMI) using DL RSs. Second, each UE demodulates the DL transmission signal intended for itself using the DL RSs. In addition, DL RSs are divided into three categories: cell-specific RSs, multi-media broadcast over a single frequency network (MBSFN) RSs, and UE-specific RSs or dedicated RSs (DRSs).

Cell-specific reference signals (or common reference signals: CRSs) are transmitted in all downlink subframes in a cell supporting non-MBSFN transmission. If a subframe is used for transmission with MBSFN, only the first a few (0, 1 or 2) OFDM symbols in a subframe can be used for transmission of cell-specific reference symbols. The notation $R_p$ is used to denote a resource element used for reference signal transmission on antenna port p.

UE-specific reference signals (or dedicated RSs: DRSs) are supported for single-antenna-port transmission on the Physical Downlink Shared Channel (PDSCH) and are transmitted on antenna port 5. The UE is informed by higher layers whether the UE-specific reference signal is present and is a valid phase reference for PDSCH demodulation or not. UE-specific reference signals are transmitted only on the resource blocks upon which the corresponding PDSCH is mapped.

The time resources of an LTE system are partitioned into 10 msec frames, and each frame is further partitioned into 10 subframes of one msec duration each. A subframe is divided into two time slots, each of which spans 0.5 msec. A subframe is partitioned in the frequency domain into multiple resource blocks (RBs), where an RB is composed of 12 subcarriers.

Figure 4:
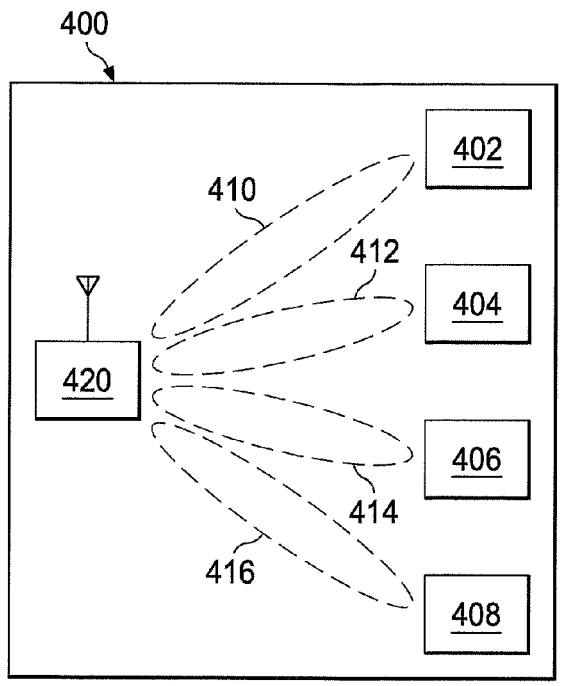
FIG. 4 illustrates a diagram of a base station in communication with a plurality of mobile stations according to an embodiment of this disclosure.

FIG. 4 illustrates a diagram 400 of a base station 420 in communication with a plurality of mobile stations 402, 404, 406, and 408 according to an embodiment of this disclosure.

As shown in FIG. 4, base station 420 simultaneously communicates with multiple of mobile stations through the use of multiple antenna beams, each antenna beam is formed toward its intended mobile station at the same time and same frequency. Base station 420 and mobile stations 402, 404, 406, and 408 are employing multiple antennas for transmission and reception of radio wave signals. The radio wave signals can be Orthogonal Frequency Division Multiplexing (OFDM) signals.

In this embodiment, base station 420 performs simultaneous beamforming through a plurality of transmitters to each mobile station. For instance, base station 420 transmits data to mobile station 402 through a beamformed signal 410, data to mobile station 404 through a beamformed signal 412, data to mobile station 406 through a beamformed signal 414, and data to mobile station 408 through a beamformed signal 416. In some embodiments of this disclosure, base station 420 is capable of simultaneously beamforming to the mobile stations 402, 404, 406, and 408. In some embodiments, each beamformed signal is formed toward its intended mobile station at the same time and the same frequency. For the purpose of clarity, the communication from a base station to a mobile station may also be referred to as downlink communication, and the communication from a mobile station to a base station may be referred to as uplink communication.

Base station 420 and mobile stations 402, 404, 406, and 408 employ multiple antennas for transmitting and receiving wireless signals. It is understood that the wireless signals may be radio wave signals, and the wireless signals may use any transmission scheme known to one skilled in the art, including an Orthogonal Frequency Division Multiplexing (OFDM) transmission scheme.

Mobile stations 402, 404, 406, and 408 may be any device that is capable receiving wireless signals. Examples of mobile stations 402, 404, 406, and 408 include, but are not limited to, a personal data assistant (PDA), laptop, mobile telephone, handheld device, or any other device that is capable of receiving the beamformed transmissions.

The use of multiple transmit antennas and multiple receive antennas at both a base station and a single mobile station to improve the capacity and reliability of a wireless communication channel is known as a Single User Multiple Input Multiple Output (SU-MIMO) system. A MIMO system promises linear increase in capacity with K where K is the minimum of number of transmit (M) and receive antennas (N) (i.e., K=min(M,N)). A MIMO system can be implemented with the schemes of spatial multiplexing, a transmit/receive beamforming, or transmit/receive diversity.

As an extension of SU-MIMO, multi-user MIMO (MU-MIMO) is a communication scenario where a base station with multiple transmit antennas can simultaneously communicate with multiple mobile stations through the use of multi-user beamforming schemes such as Spatial Division Multiple Access (SDMA) to improve the capacity and reliability of a wireless communication channel.

Figure 5:
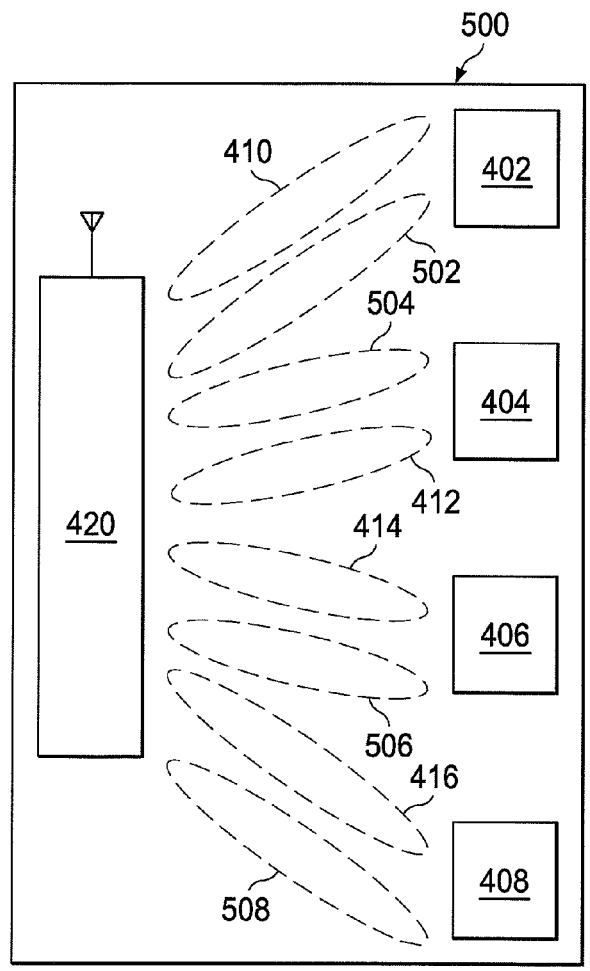
FIG. 5 illustrates a spatial division multiple access (SDMA) scheme according to an embodiment of this disclosure.

FIG. 5 illustrates an SDMA scheme according to an embodiment of this disclosure.

As shown in FIG. 5, base station 420 is equipped with 8 transmit antennas while mobile stations 402, 404, 406, and 408 are each equipped two antennas. In this example, base station 420 has eight transmit antennas. Each of the transmit antennas transmits one of beamformed signals 410, 502, 504, 412, 414, 506, 416, and 508. In this example, mobile station 402 receives beamformed transmissions 410 and 502, mobile station 404 receives beamformed transmissions 504 and 412, mobile station 406 receives beamformed transmissions 506 and 414, and mobile station 408 receives beamformed transmissions 508 and 416.

Since base station 420 has eight transmit antenna beams (each antenna beams one stream of data streams), eight streams of beamformed data can be formed at base station 420. Each mobile station can potentially receive up to 2 streams (beams) of data in this example. If each of the mobile stations 402, 404, 406, and 408 was limited to receive only a single stream (beam) of data, instead of multiple streams simultaneously, this would be multi-user beamforming (i.e., MU-BF).

In Release 8 LTE systems, a UE is required to perform channel estimation based on common reference signals (CRSs) over the entire bandwidth. Once channel estimation is performed, the UE performs demodulation based on different transmission modes indicated by the different formats of the downlink control information. For example, when downlink spatial multiplexing is performed, downlink control information (DCI) format 2 is used, and the UE performs demodulation based on the resource assignment and TPMI (transmission PMI) contained in the DCI format. For example, in 3GPP TS 36.212 v 8.8.0, "E-UTRA, Multiplexing and Channel Coding", December 2009, the definition of TPMI is defined in Table 5.3.3.1.5-4 (2 antenna ports) and in Table 5.3.3.1.5-5 (4 antenna ports) of Section 5.3.3.1.5, which is hereby incorporated by reference into the present application as if fully set forth herein.

The eNodeB indicates whether it is wideband precoding or subband precoding to UE based on the UE's feedback, and the UE performs downlink demodulation accordingly.

In LTE-Advanced (LTE-A) systems, the downlink demodulation is based on dedicated reference signals (DRS), a.k.a. UE-specific reference signals (UE-RS).

In LTE-Advanced systems, demodulation of the data channel is based precoded UE-specific reference signal, that is, the reference signals are precoded using the same precoder as the data channel as described in R1-090529 "Way forward on CoMP and MIMO DL RS", Outcome of ad hoc discussions, January 2009, and R1-091066 "Way forward on downlink reference signals for LTE-A", CATT, CMCC, Ericsson, Huawei, LGE, Motorola, Nokia, Nokia Siemens Networks, Nortel, Panasonic, Philips, Qualcomm Europe, Samsung, Texas Instruments, March 2009, both of which are hereby incorporated by reference into the present application as if fully set forth herein.

RSs targeting PDSCH demodulation (for LTE-A operation) are UE specific and are transmitted only in scheduled RBs and the corresponding layers. Different layers can target the same or different UEs. The design principle is an extension of the concept of Rel-8 UE-specific RS (used for beamforming) to multiple layers. RSs on different layers are mutually orthogonal. RSs and data are subject to the same precoding operation, and complementary use of Rel-8 CRS by the UE is not precluded.

In R1-094413, "Way forward on the details of DCI format 2B for enhanced DL transmission," 3GPP RAN1#58bis, Miyazaki, October 2009,which is hereby incorporated by reference into the present application as if fully set forth herein, an agreement has been made for DCI format 2B as follows:

The DCI Format 2B is based on DCI Format 2A;
1 bit is added for the source channel identifier (SC-ID);
The Swap Flag is removed;
For rank 1 transmission, the new data indicator (NDI) bit of the disabled transport block is re-used to indicate port information. A value of 0 is used to indicate an enabled transport block (TB) associated with port 7. A value of 1 is used to indicate an enabled transport block associated with port 8; and For rank 2 transmission, TB1 is associated with port 7, and TB2 associated with port 8.

DCI format 2C can be constructed based on DCI format 2B for Rel. 10 transmission modes for facilitating dynamic SU- and MU-MIMO switching.

Since an eNodeB could potentially perform resource block (RB)-based precoding, the baseline granularity for channel estimation and demodulation is one RB. However, as disclosed in R1-093105, "UE-RS Patterns for LTE-A", Qualcomm Europe, August 2009, which is hereby incorporated by reference into the present application as if fully set forth herein, "RB-bundling" (bundle contiguous RBs together to perform channel estimation and demodulation) will help higher rank (i.e., rank 5 to 8) transmissions achieve adequate channel estimation accuracy along with a low overhead. It is also disclosed in R1-094575, "Discussion on DM-RS for LTE-Advanced", Samsung, November 2009; R1-094438, "On Rel-10 DM RS design for rank 5-8", Ericsson, ST-Ericsson, November 2009; and R1-094548, "Further investigation on DMRS design for LTE-A", CATT, November 2009, which are hereby incorporated by reference into the present application as if fully set forth herein, that "RB bundling" could be used to balance the transmission power imbalance across OFDM symbols for some high rank DM-RS patterns.

FIG. 6 illustrates dedicated reference signal (DRS) patterns that support two and four layer transmissions according to an embodiment of this disclosure.

DRS patterns 601 and 603 illustrate pilot patterns that can support up to 2 layer transmissions. DRS REs labeled with 0,1 in DRS pattern 601 carry DRS for layer 0 and 1 with the RSs of the two layers code-division multiplexed (CDMed). Similarly, for DRS REs labeled with 2,3 in DRS pattern 603 carry DRS for layer 2 and 3 with the RSs of the two layers code-division multiplexed (CDMed).

In the two adjacent DRS REs labled with 0,1, DRS symbols [r0 r1] for layer 0 are mapped to the two REs spread by a Walsh code [1 1], which results in [r0 r1], while DRS symbols r2 and r3 for layer 1 are mapped to the two REs spread by a Walsh code [1-1], which results in [r2-r3].

DRS pattern 605 illustrates a pilot pattern that can support up to four layer transmissions, where the DRS REs are again partitioned into two, those labeled with 0,1 and those with 2,3. In this pattern, the DRS REs labeled with 0,1 carry DRSs for layer 0 and 1 with the RSs of the two layers code-division multiplexed (CDMed), and the DRS REs labeled with 2,3 carry DRSs for layer 2 and 3 with the RSs of the two layers code-division multiplexed(CDMed).

Figure 7:
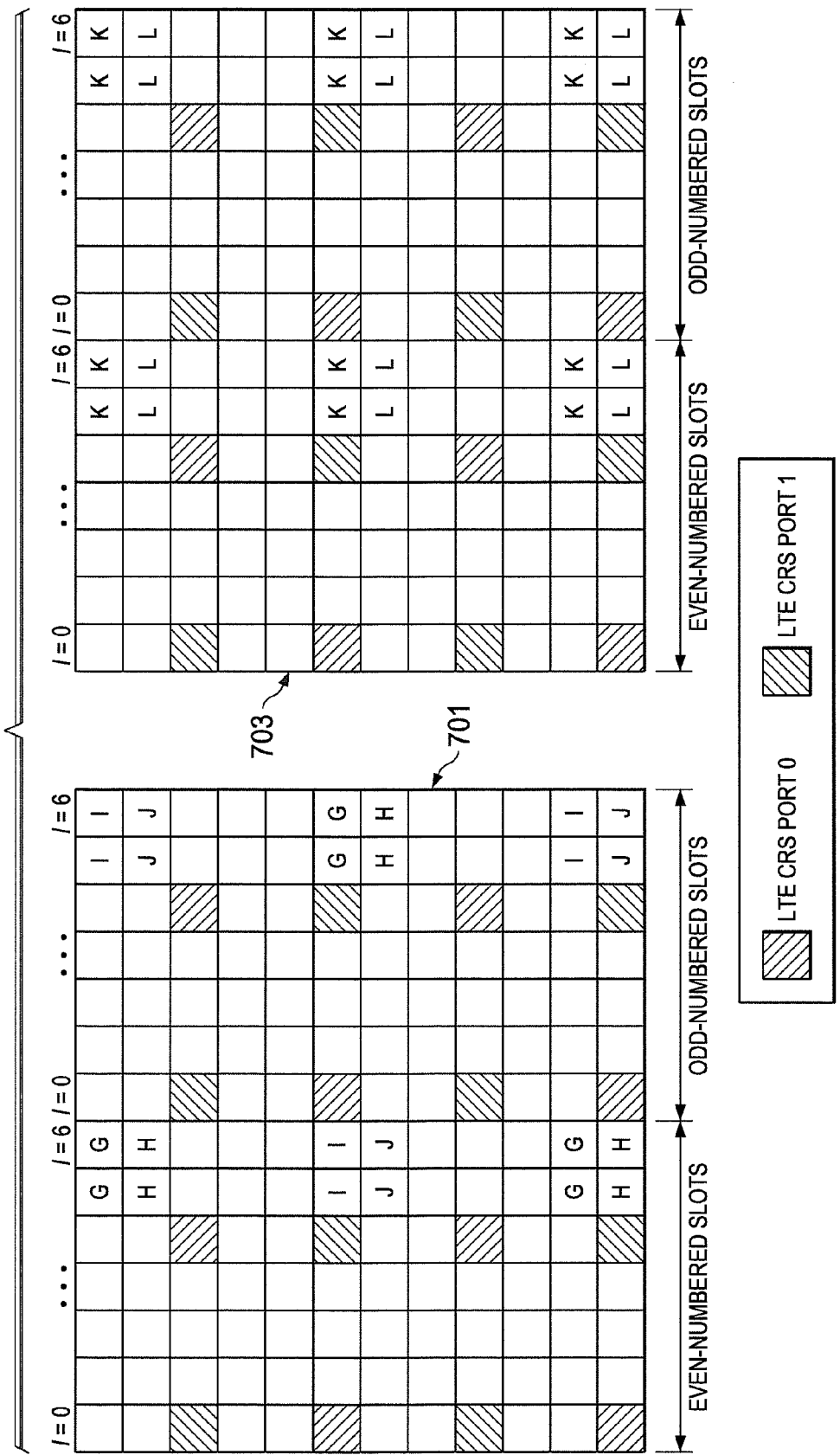
FIG. 7 illustrates DRS patterns that support eight layer transmissions according to an embodiment of this disclosure.

FIG. 7 illustrates DRS patterns that support eight layer transmissions according to an, embodiment of this disclosure.

With regard to FIG. 7, REs labeled with alphabet X, where X is one of G, H, I, J, L, K, are used for carrying a number of DRS among the 8 DRS, where the number of DRS are CDM'ed. DRS pattern 701 is based on spreading factor 2 CDM across two time-adjacent REs with the same alphabet label. DRS pattern 703 is based on spreading factor 4 CDM across two groups of two time-adjacent REs with the same alphabet label. In this embodiment, the 8 antenna ports in a Rank-8 pattern are referred to as antenna ports 4,5,6,7,8,9,10, 11 in the sequel to distinguish them from the antenna ports in Rank-2 and Rank-4 patterns.

It is noted that in Rel8 LTE, antenna ports 0, 1, 2, 3, 4, 5 are used for CRS, MBSFN RS and Rel8 DRS. Hence, if the numbering convention extending Rel8 LTE is followed, the new antenna port numbers will start from 6. Rank-2 pattern will have antenna ports 6,7. Rank-4 pattern will have antenna ports 7,8,9,10. Rank-8 pattern will have antenna ports 11, 12, 13, 14, 15, 16, 17, 18.

In one embodiment of DRS pattern 701, G carries DRS 4, 5. H carries DRS 6,7. I carries DRS 8,9. J carries DRS 10,11. In one embodiment of DRS pattern 703, K carries DRS 4,5, 6,7; and L carries DRS 8,9,10,11.

Each of the DM-RS patterns in FIGS. 6 and 7 is RB based. Accordingly, a UE could perform channel estimation and demodulation per RB. Alternatively, if RB bundling is supported, the UE could perform channel estimation and demodulation jointly across bundled RBs. In this way, the performance of channel estimation and demodulation can be improved.

RB-bundling gain is achieved only when an eNodeB performs the same downlink precoding vectors across the bundled RBs. Accordingly, a UE will have to perform channel estimation and demodulation over the bundled RBs jointly.

In other words, RB bundling will reduce the precoding flexibility since the precoding vectors within the bundled RBs have to be the same. This clearly suggests a trade-off between gains from increasing channel interpolation span in frequency versus losses from increasing frequency selective precoding granularity.

The advantage of RB bundling is that channel estimation performance is improved. However, the eNodeB cannot perform per RB encoding if the eNode B does not receive per RB feedback from the UE due to large overhead.

The advantage of not enabling RB bundling is that the eNodeB does not need the UE to feedback the PMI in order to perform channel estimation and demodulation. Instead, the eNodeB could rely upon uplink channel sounding in TDD systems. Furthermore, the eNodeB would have the flexibility to perform per RB pre-coding, which results in a higher pre-coding gain. However, the UE would then have to perform per RB channel estimation if the channel is very selective.

Therefore, it would be advantageous to be able to turn on or off the feature of RB-bundling depending on the channel conditions.

This disclosure provides systems and methods for enabling RB-bundling.

In some embodiments of this disclosure, an eNodeB transmits an indication to turn on or off the feature of RB-bundling to a UE.

When RB-bundling is turned on or enabled, the eNodeB performs the same downlink precoding vectors across a number of continuous RBs (the RB-bundling size), and the UE performs channel estimation and demodulation jointly on the bundled RBs. When RB-bundling is turning off or not enabled, the eNodeB performs downlink precoding on a per-RB basis, and the UE performs channel estimation and demodulation on a per RB basis as well.

The indication from the eNodeB to the UE to indicate whether RB bundling is enabled can be achieved several ways.

In some embodiments of this disclosure, a signaling from the eNodeB to UE indicating whether RB-bundling is enabled can be either semi-statically signaled through higher-layer signaling or dynamically signaled utilizing the available code-points in a DCI format. Furthermore, this signaling can be either explicit or implicit.

FIG. 8 illustrates a table 800 depicting the use of a one bit signalidg to turn on or turn off resource block (RB) bundling according to an embodiment of this disclosure.

In some embodiments of this disclosure, explicit signaling is used to turn on or off RB-bundling. For example, higher layer signaling is used to semi-statistically turn on or off RB bundling. For example, as shown in table 800, a one bit signaling can be used to semi-statistically turn on or turn off RB bundling. In this particular example, a first value of "0" indicates a first state in which RB bundling is turned off or disabled. A second value of "1" indicates a second state in which RB bundling is turned on or enabled. In another example, a sequence of bits is used to indicate states related to RB-bundling. One particular state indicated by this sequence of bits could be interpreted at the UE as turning off RB-bundling.

FIG. 9 illustrates a table 900 depicting the use of available downlink control information (DCI) code-points to turn on or turn off resource block RB bundling according to an embodiment of this disclosure.

As shown in FIG. 9, available DCI code-points are also used to dynamically turn on or off RB bundling. For example, in DCI format 2X, a state is defined to turn on RB bundling by adding an additional field to DCI format 2C. In this particular example, a first state indicated by the additional field is a state in which RB bundling is turned on or enabled. A second state indicated by the additional field is a state in which RB bundling is turned off or disabled.

In some embodiments of this disclosure, implicit signaling is used to turn on or off RB-bundling. For example, whether RB bundling is enabled is based on a specific transmission mode, the DCI format used for a DL grant, the transmission scheme, and the radio network temporary identifier (RNTI) configuration.

For example, RB bundling is turned on or enabled if a UE is configured in Rel. 9 transmission mode (mode 8 in 3GPP 36.213), and if the UE received a physical downlink shared channel (PDSCH) packet scheduled with DCI format 2B.

In addition, if the UE receives a PDSCH packet scheduled with DCI format 1A and the associated transmission scheme is TxD (scheduled by semi-persistent scheduling (SPS) RNTI, and for the case when the physical broadcast channel (PBCH) signals multiple antenna ports), then RB bundling is turned off or disabled. If the UE receives a PDSCH packet scheduled with DCI format 1A, and the associated transmission scheme is single antenna port transmission (1. scheduled by SPS-RNTI, and for the case when the PBCH signals one antenna port; or 2. scheduled by cell radio network temporary identifier (C-RNTI)), then RB bundling is turned on or enabled.

For example, RB bundling is turned on or enabled if a UE is configured in Rel. 10 transmission mode for both SU and MU MIMO transmission, and if the UE received a PDSCH packet scheduled with DCI format 2C (DCI format in Rel-10 used to support 2 codeword MIMO transmission).

In addition, if the UE receives a PDSCH packet scheduled with DCI format 1A, and the associated transmission scheme is TxD (scheduled by SPS RNTI, and for the case when the PBCH signals multiple antenna ports), then RB bundling is turned off or disabled. If the UE receives a PDSCH packet scheduled with DCI format 1A, and the associated transmission scheme is single antenna port transmission (1. scheduled by SPS-RNTI, and for the case when the PBCH signals one antenna port; or 2. scheduled by C-RNTI), then RB bundling is turned on or enabled.

In other embodiments of this disclosure, RB bundling is turned on or off based on a specific feedback mode.

For example, if a UE is configured in Rel-9 and Rel-10 transmission modes and precoding matrix indicator/rank indicator (PMI/RI) feedback is configured, RB bundling is turned on or enabled. Otherwise, if the UE is configured in Rel-10 and beyond Rel-10 transmission modes and PMI/RI feedback is not configured, RB bundling is turned off or disabled. This is because the application scenario for configuring PMI/RI feedback is for frequency-division duplexing (FDD) systems while the application scenario for configuring PMI/RI feedback is not for time-division duplexing TDD systems. As discussed early in TDD systems, an eNodeB may obtain the channel state information using uplink sounding to perform frequency selective precoding. In this case, PRB bundling should be turned off accordingly. Furthermore, even in FDD systems, when the eNodeB decides to perform open-loop operations, the eNodeB will not configure the UE to feedback PMI/RI. Therefore, PRB bundling is also turned off in this case to allow for flexible operation at the eNodeB.

In another example, when wideband channel quality indicator (CQI)/PMI/RI (wideband CQI) feedback mode is configured, RB bundling is turned on or enabled. When subband CQI/PMI/RI (subband CQI) feedback mode is configured, RB bundling is turned off or disabled.

In other embodiments of this disclosure, an RB bundling on/off indication can also be realized through other system indications from the eNodeB to the UE. For example, RB bundling is enabled once the rank indicator (RI) is greater than a predetermined value.

In yet other embodiments of this disclosure, RB bundling is always on for demodulation using Rel. 9 or Rel. 10 UE-RS.

In order to perform different types of feedback reports, the UE is configured by the eNodeB in different feedback modes.

In some embodiments of this disclosure, RB-bundling is turned on or off based on the specific feedback mode configured by the eNodeB.

In one embodiment, RB-bundling is turned on or off based on the specific physical uplink control channel (PUCCH) feedback mode.

For example, RB bundling is turned on or enabled when when the UE is configured with PMI/RI reporting, and RB bundling is turned off or disabled when the UE is not configured with PMI/RI reporting.

Accordingly, when the UE is configured with PMI/RI reporting, the pre-coding granularity at the eNodeB is multiple physical resource blocks. That is the eNodeB performs the same pre-coding over a bundled resource block where a bundled resource block comprises multiple consecutive physical resource blocks.

Accordingly, when the UE is configured with PMI/RI reporting, the feedback granularity at the UE is set to multiple physical resource blocks such that the UE performs a channel estimation over a bundled resource block where a bundled resource block comprises multiple consecutive physical resource blocks.

Furthermore, when the UE is not configured with PMI/RI reporting, the pre-coding granularity at the eNodeB is a single physical resource block. That is the eNodeB performs pre-coding on a per physical resource block basis.

Accordingly, when the UE is not configured with PMI/RI reporting, the feedback granularity at the UE is set to a single physical resource block such that the UE performs a channel estimation on a per physical resource block basis.

In 3GPP TS 36.213 v 8.8.0, "E-UTRA, Physical Layer Procedures", December 2009, which is hereby incorporated by reference into the present application as if fully set forth herein, depending on the mode of periodic PUCCH feedback, RB bundling is turned on or enabled when the UE is configured in mode 1-1 and mode 2-1 of Table 7.2.2-1, and RB bundling is turned off or disabled when the UE is configured in mode 1-0 and mode 2-0.

In other embodiments of this disclosure, RB-bundling is turned on or off based on the based on the specific physical uplink shared channel (PUSCH) feedback mode.

In some embodiments of this disclosure, RB bundling is turned on or enabled when the UE is configured for "single PMI" and/or "multiple PMI" feedback, and RB bundling is turned off or disabled otherwise.

For example, RB bundling is turned on or enabled when the UE is configured for "single PMI" feedback, and RB bundling is turned off or disabled when the UE is configured for "No PMI" or "Multiple PMI" feedback.

In another example, RB bundling is turned on or enabled when the UE is configured for "single PMI" and "Multiple PMI" feedback, and RB bundling is turned off or disabled when the UE is configured for "No PMI" feedback.

In yet another example, RB bundling is turned on or enabled when the UE is configured for "Multiple PMI" feedback, and RB-bundling is turned off or disabled when the UE is configured for "No PMI" or "Single PMI" feedback.

For example, in 3GPP TS 36.213 v 8.8.0, "E-UTRA, Physical Layer Procedures", December 2009, depending on the mode of aperiodic PUSCH feedback, RB bundling is turned on or enabled when the UE is configured in mode 3-1, and RB bundling is turned off or disabled in other feedback modes.

Once RB bundling is on or enabled, the granularity of the RB bundling has to be decided. As described earlier, the granularity of the RB bundling refers to the number of continuous PRBs used for channel estimation and demodulation.

In some embodiments of this disclosure, the RB-bundling granularity is set to be the unit of downlink resource allocation.

For example, in 3GPP TS 36.211 v 8.8.0, "E-UTRA, Physical channels and modulation", December 2009, which is hereby incorporated by reference into the present application as if fully set forth herein, the unit of downlink resource allocation is a resource block group (RBG), the size of RBG is dependent on the total system bandwidth. Therefore, the granularity of RB bundling can be the RBG size.

In other embodiments of this disclosure, the RB-bundling granularity is set to be the feedback granularity. The feedback granularity refers to the number of continuous RBs used by the UE to perform PMI/CQI/RI feedback.

For example, in 3GPP TS 36.211 v 8.8.0, "E-UTRA, Physical channels and modulation", December 2009, feedback granularity for PUSCH feedback is the subband size defined in Section 7.2.1 for higher layer-configured subband feedback or UE-selected subband feedback. The feedback granularity for PUCCH feedback is defined in Section 7.2.2.

Therefore, in some embodiments, the RB-bundling granularity is set to be the subband size of the PUCCH feedback as a function of the total system bandwidth.

Alternatively, the RB-bundling granularity is related to the subband size of the PUSCH feedback.

For example, if RB bundling is turned on or enabled by the eNodeB configuring specific feedback mode, then the granularity of RB is the subband size of the corresponding feedback mode.

FIG. 10 illustrates subbands bundled together according to an embodiment of this disclosure.

In yet other embodiments of this disclosure, the RB-bundling granularity is set to be jointly decided by the feedback granularity as well as the downlink resource allocation unit. Feedback granularity refers to the number of continuous RBs used by the UE to perform PMI/CQI/RI feedback.

For example when a UE is configured to have PUSCH "Multiple PMI" feedback, the eNodeB would perform downlink precoding based on the UE feedback subband size, and the UE would assume the RBs in the downlink resource allocation from the same subband bundled together as shown in FIG. 10.

In FIG. 10, a first subband 1010 includes a first RB bundle 1001, and a second subband 1020 includes a second RB bundle 1011. The first RB bundle 1001 and the second RB bundle 1011 are bundled together to form an RBG 1030.

In further embodiments of this disclosure, the RB-bundling granularity is set according to the subband size associated with the configured feedback modes.

In one such embodiment, the RB-bundling granularity depends on the configured PUSCH feedback modes.

For example, when wideband feedback is configured (mode 3-1), all the allocated RBs are bundled to perform channel estimation and demodulation.

In another example, when subband feedback is configured (mode 1-2, mode 2-2), RB bundling follows the subband size from the UE PUSCH feedback and/or the resource block group (RBG) size.

In a further example, when no PMI feedback is configured (mode 2-0, mode 3-0), RB bundling is turned off or disabled.

In some embodiments of this disclosure, the RB-bundling granularity depends on the configured PUCCH feedback modes.

For example, when wideband feedback is configured (mode 1-1, mode 2-1), RB bundling follows the subband size from the PUCCH feedback (higher layer configured feedback subband size) and/or the RBG size.

For example, when no PMI feedback is configured (mode 1-0, mode 2-0), RB bundling is turned off or disabled.

In some embodiments of this disclosure, the size of RB bundling is fixed.

For example, the size of RB bundling can be an even number to facilitate pattern rotation of UE-RS patterns for higher ranks as suggested in R1-094575, "Discussion on DM-RS for LTE-Advanced", Samsung, November 2009, which is hereby incorporated by reference into the present application as if fully set forth herein.

FIG. 11 illustrates a DCI format 2C 1100 according to an embodiment of this disclosure.

As shown in FIG. 11, in some embodiments of this disclosure, DCI format 2C 1100 is constructed by adding a new N3-bit for the indication of a combination of a selected DM RS pattern and a DM RS index set to DCI format 2B to support dynamic switching of SU- and MU-MIMO. A new data indicator (NDI) bit of a disabled transport block (TB) in DCI format 2B is used for indicating a DM RS index in the case of rank-1 indication in Rel-9 LTE. Hence, this embodiment uses codepoints constructed by a combination of an NDI bit of a disabled TB, such as the NDI bit in NDI field 1101 or NDI field 1103, and the new N3-bit in the N3-bit field 1105 for indicating rank-1 states in the restricted subset.

FIG. 12 illustrates a table 1200 depicting restricted subsets according to an embodiment of this disclosure.

In some embodiments, a state in a restricted subset A is signalled by DCI format 2C, where the restricted subset A is shown in table 1200 as an example. In particular embodiments, the restricted subset A is constructed such that all possible states from Rank-2 patterns A and B are included, no Rank-2 states from Rank-4 are included, and only higher rank states are included from Rank-8.

The motivations of this subset restriction are that:
rank 1 and rank 2 transmissions are supported with minimal UE-RS overhead;
MU-MIMO is explicitly supported only for rank-1 with orthogonal UE-RS in Rank-2 and Rank-4 patterns; and higher RS overhead is allowed only for ranks 3 or above.

FIG. 13 illustrates a table 1300 depicting a mapping of states in a restricted subset to codepoints in DCI format 2C according to an embodiment of this disclosure.

FIG. 13 illustrates one example mapping of states in restricted subset A to codepoints in DCI format 2C.

FIG. 14 illustrates a table 1400 depicting restricted subsets according to another embodiment of this disclosure.

In this embodiment, a state in restricted subset B is signalled by DCI format 2C. In this embodiment, the restricted subset B is constructed such that all possible states from Rank-2 patterns A and B are included, no Rank-2 states from Rank-4 are included, and only higher rank states are included from Rank-8. The motivations of this subset restriction are that:

MU-MIMO is explicitly supported for rank-1 with orthogonal UE-RS in Rank-2 and Rank-4 patterns;
MU-MIMO is explicitly supported for rank-2 with orthogonal UE-RS in Rank-4 pattern; and
higher RS overhead is allowed for ranks 2 or above.

FIG. 15 illustrates a table 1500 depicting a mapping of states in a restricted subset to codepoints in DCI format 2C according to another embodiment of this disclosure.

FIG. 15 illustrates one example mapping of states in restricted subset B to codepoints in DCI format 2C.

Figure 16:
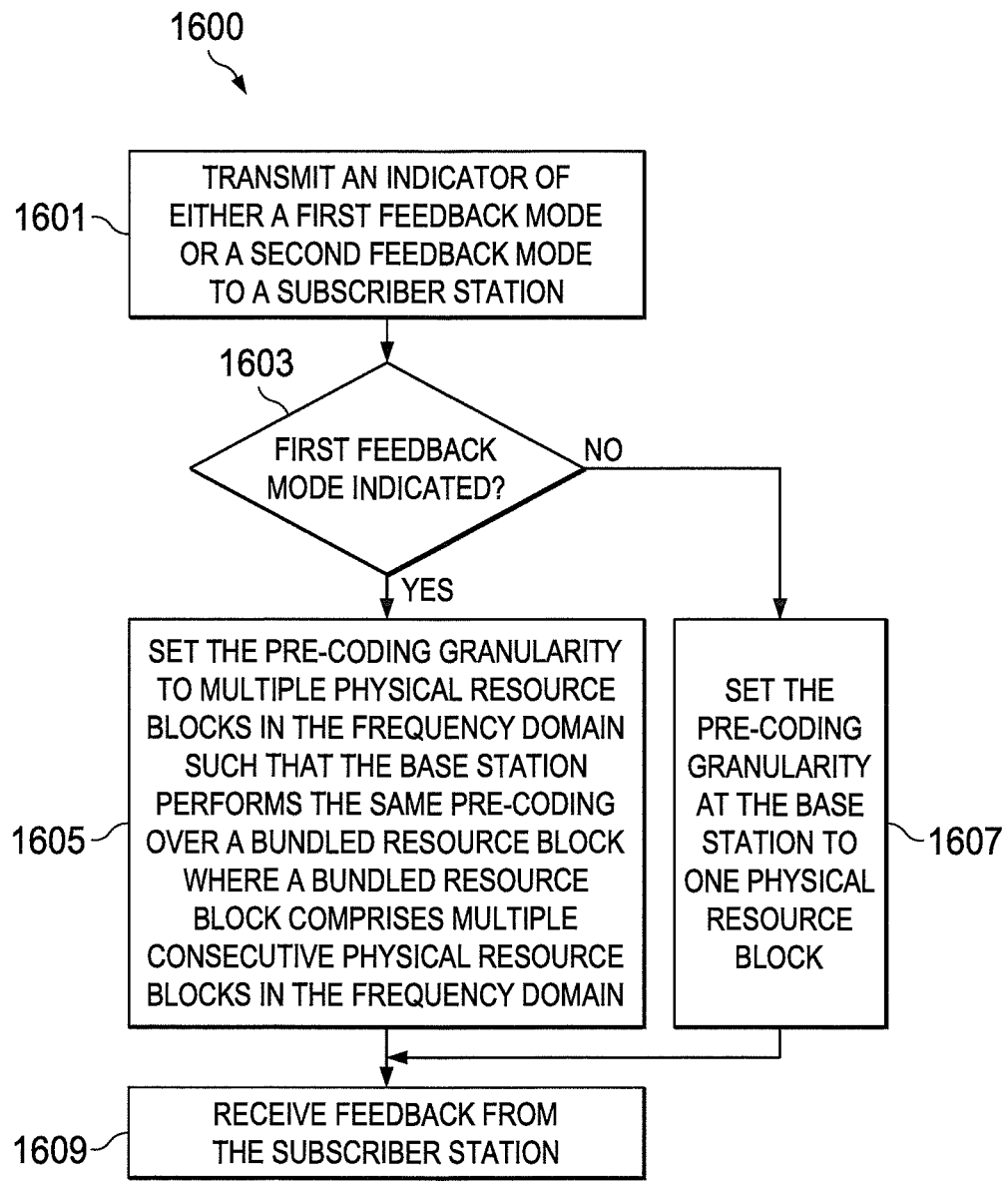
FIG. 16 illustrates a method of operating a base station according to an embodiment of this disclosure.

FIG. 16 illustrates a method 1600 of operating a base station according to an embodiment of this disclosure.

The method 1600 includes transmitting an indication of either a first feedback mode or a second feedback mode to a subscriber station (block 1601) and determining whether the first feedback mode is indicated by the indicator (block 1603). The method 1600 also includes setting the pre-coding granularity at the base station to multiple physical resource blocks in the frequency domain such that the base station performs the same pre-coding over a bundled resource block where a bundled resource block comprises multiple consecutive physical resource blocks in the frequency domain if the first feedback mode is indicated by the indicator (block 1605) and setting the pre-coding granularity at the base station to one physical resource block if the second feedback mode is indicated by the indicator (block 1607). The method 1600 further includes receiving feedback from the subscriber station (block 1609).

Figure 17:
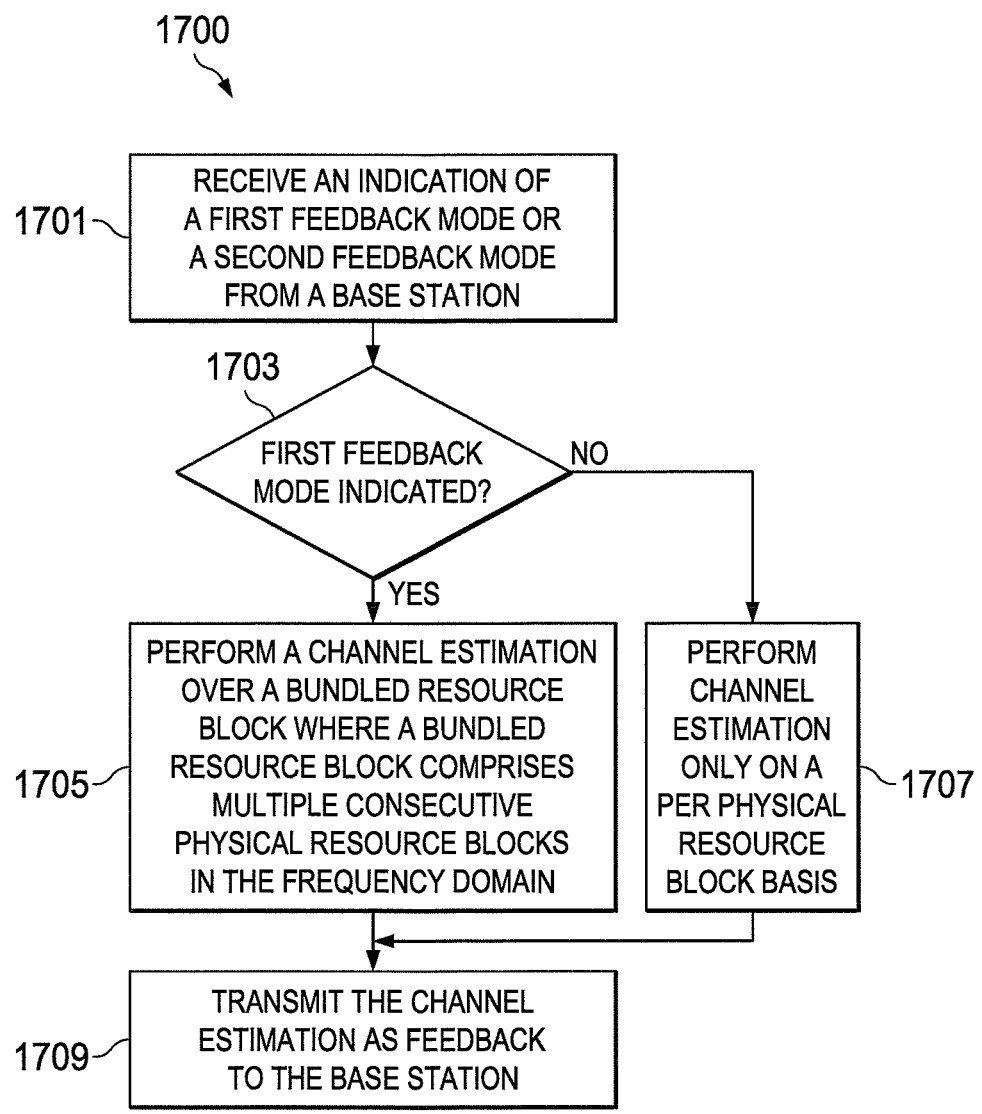
FIG. 17 illustrates a method of operating a subscriber station according to an embodiment of this disclosure.

FIG. 17 illustrates a method 1700 of operating a subscriber station according to an embodiment of this disclosure.

The method 1700 includes receiving an indication of a first feedback mode or a second feedback mode from a base station (block 1701), and determining whether the first feedback mode is indicated by the indicator (block 1703). The method 1700 also includes performing a channel estimation over a bundled resource block where a bundled resource block comprises multiple consecutive physical resource blocks in the frequency domain if the first feedback mode is indicated by the indicator (block 1705), and performing channel estimation only on a per physical resource block basis if the second feedback mode is indicated by the indicator (block 1707). The method 1700 further includes transmitting the channel estimation as feedback to the base station (block 1709).

Figure 18:
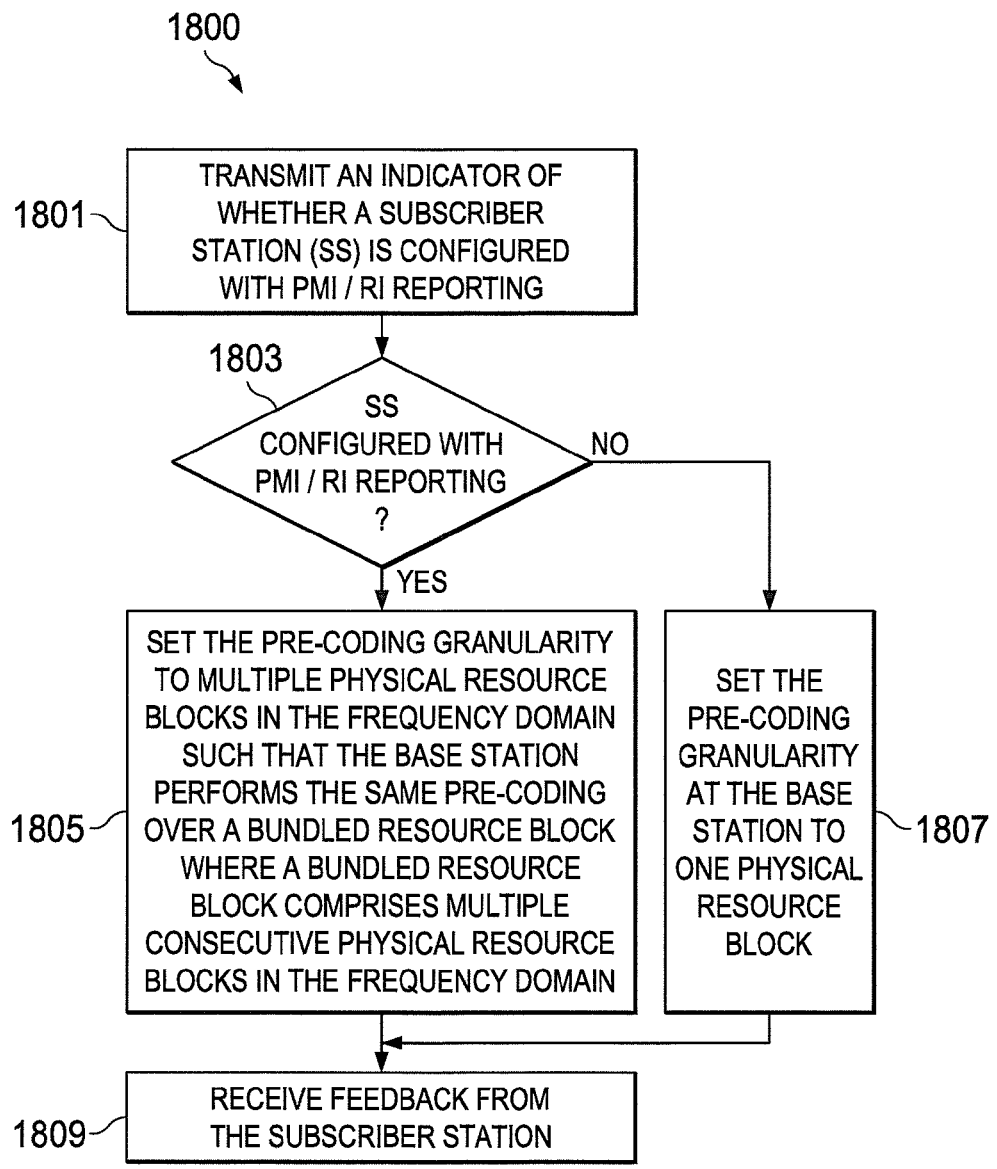
FIG. 18 illustrates a method of operating a base station according to another embodiment of this disclosure.

FIG. 18 illustrates a method 1800 of operating a base station according to another embodiment of this disclosure.

The method 1800 includes transmitting an indication of whether a subscriber station is configured with precoding matrix indicator/rank indicator (PMI/RI) reporting (block 1801), and determining whether the subscriber station is configured with PMI/RI reporting (block 1803). The method 1800 also includes setting the pre-coding granularity at the base station to multiple physical resource blocks in the frequency domain such that the base station performs the same pre-coding over a bundled resource block where a bundled resource block comprises multiple consecutive physical resource blocks in the frequency domain if the subscriber station is configured with PMI/RI reporting (block 1805) and setting the pre-coding granularity at the base station to one physical resource block if the subscriber station is not configured with PMI/RI reporting (block 1807). The method 1800 further includes receiving feedback from the subscriber station (block 1809).

Figure 19:
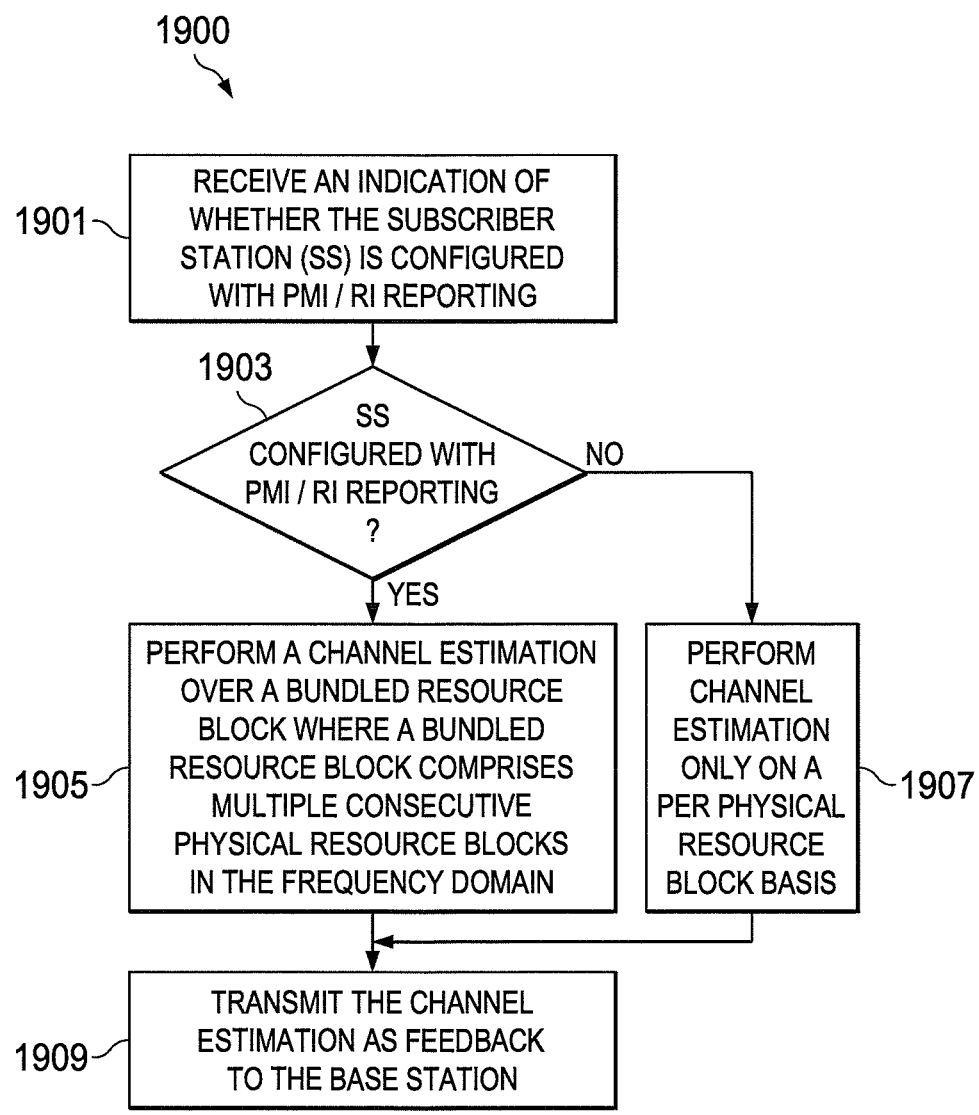
FIG. 19 illustrates a method of operating a subscriber station according to another embodiment of this disclosure.

FIG. 19 illustrates a method 1900 of operating a subscriber station according to another embodiment of this disclosure.

The method 1900 includes receiving from a base station an indication of whether the subscriber station is configured with precoding matrix indicator/rank indicator (PMI/RI) reporting (block 1901), and determining whether the subscriber station is configured with PMI/RI reporting (block 1903). The method 1900 also includes performing a channel estimation over a bundled resource block where a bundled resource block comprises multiple consecutive physical resource blocks in the frequency domain if the subscriber station is configured with PMI/RI reporting (block 1905), and performing channel estimation only on a per physical resource block basis if the subscriber station is not configured with PMI/RI reporting (block 1907). The method 1900 further includes transmitting the channel estimation as feedback to the base station (block 1909).

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. A base station, comprising:
a transmit path circuitry configured to:
   transmit, to a subscriber station, a control information, wherein a first content of the control information indicates to the subscriber station to select operation with precoding matrix indicator/rank indicator (PMI/RI) reporting during a next transmission by the subscriber station to the base station and a second content of the control information indicates to the subscriber station to select operation without PMI/RI reporting during the next transmission by the subscriber station to the base station, and
   set a pre-coding granularity for the subscriber station based upon whether the control information indicates that the subscriber station is configured for operation with PMI/RI reporting during the next transmission by the subscriber station to the base station,
      wherein the pre-coding granularity for the subscriber station is set to multiple physical resource blocks in a frequency domain to perform a substantially same pre-coding over a bundled resource block when the control information contains the first content indicating to the subscriber station to operate with PMI/RI reporting during the next transmission by the subscriber station to the base station,
      wherein the pre-coding granularity for the subscriber station is not set to multiple physical resource blocks in a frequency domain when the control information contains the second content indicating to the subscriber station to operate without PMI/RI reporting during the next transmission by the subscriber station to the base station, and wherein the bundled resource block comprises multiple consecutive physical resource blocks in the frequency domain; and a receive path circuitry configured to receive feedback from the subscriber station, wherein, when the control information contains the first content, the feedback includes PMI/RI reporting.

2. The base station in accordance with claim 1, wherein the transmit path circuitry is further configured to set the pre-coding granularity to one physical resource block when the control information indicates to the subscriber station to operate without PMI/RI reporting.

3. A method of operating a base station, the method comprising:

transmitting, to a subscriber station, a control information, wherein a first content of the control information indicates to the subscriber station to select operation with precoding matrix indicator/rank indicator (PMI/RI) reporting during a next transmission by the subscriber station to the base station and a second content of the control information indicates to the subscriber station to select operation without PMI/RI reporting during the next transmission by the subscriber station to the base station;

setting a pre-coding granularity for the subscriber station based upon whether the control information indicates that the subscriber station is configured for operation with PMI/RI reporting during the next transmission by the subscriber station to the base station, wherein the pre-coding granularity for the subscriber station is set to multiple physical resource blocks in a frequency domain to perform a substantially same pre-coding over a bundled resource block when the control information contains the first content indicating to the subscriber station to operate with PMI/RI reporting during the next transmission by the subscriber station to the base station, wherein the pre-coding granularity for the subscriber station is not set to multiple physical resource blocks in a frequency domain when the control infoimation contains the second content indicating to the subscriber station to operate without PMI/RI reporting during the next transmission by the subscriber station to the base station, and wherein the bundled resource block comprises multiple consecutive physical resource blocks in the frequency domain; and receiving feedback from the subscriber station, wherein, when the control information contains the first content, the feedback includes PMI/RI reporting.

4. The method in accordance with claim 3, further comprising:

setting the pre-coding granularity to one physical resource block when the control information indicates to the subscriber station to operate without PMI/RI reporting.

5. A subscriber station, comprising:

a receive path circuitry configured to:

receive, from a base station, a control information, wherein a first content of the control information indicates to the subscriber station to select operation with precoding matrix indicator/rank indicator (PMI/RI) reporting during a next transmission by the subscriber station to the base station and a second content of the control information indicates to the subscriber station to select operation without PMI/RI reporting during the next transmission by the subscriber station to the base station, and perform a channel estimation based upon whether the control information indicates that the subscriber station is configured for operation with PMI/RI reporting during the next transmission by the subscriber station to the base station, wherein the channel estimation is performed by the subscriber station over a bundled resource block when the control information contains the first content indicating to the subscriber station to operate with PMI/RI reporting during the next transmission by the subscriber station to the base station, wherein the channel estimation is performed by the subscriber station over one or more resource blocks that are not bundled when the control information contains the second content indicating to the subscriber station to operate without PMI/RI reporting during the next transmission by the subscriber station to the base station, and wherein the bundled resource block comprises multiple consecutive physical resource blocks in a frequency domain; and a transmit path circuitry configured to transmit the channel estimation as feedback to the base station, wherein, when the control information contains the first content, the feedback includes PMI/RI reporting.

6. The subscriber station in accordance with claim 5, wherein the receive path circuitry is further configured to perform channel estimation only on a per physical resource block basis when the control information indicates to the subscriber station to operate without PMI/RI reporting.

7. A method of operating a subscriber station, the method comprising:

receiving, from a base station, a control information, wherein a first content of the control information indicates to the subscriber station to select operation with precoding matrix indicator/rank indicator (PMI/RI) reporting during a next transmission by the subscriber station to the base station and a second content of the control information indicates to the subscriber station to select operation without PMI/RI reporting during the next transmission by the subscriber station to the base station;

performing a channel estimation based upon whether control information indicates that the subscriber station is configured for operation with PMI/RI reporting during the next transmission by the subscriber station to the base station, wherein the channel estimation is performed by the subscriber station over a bundled resource block when the control information contains the first content indicating to the subscriber station to operate with PMI/RI reporting during the next transmission by the subscriber station to the base station, wherein the channel estimation is performed by the subscriber station over one or more resource blocks that are not bundled when the control information contains the second content indicating to the subscriber station to operate without PMI/RI reporting during the next transmission by the subscriber station to the base station, and wherein the bundled resource block comprises multiple consecutive physical resource blocks in a frequency domain; and transmitting the channel estimation as feedback to the base station, wherein, when the control information contains the first content, the feedback includes PMI/RI reporting.

8. The method in accordance with claim 7, further comprising:
performing channel estimation only on a per physical resource block basis when the control information indicates to the subscriber station to operate without PMI/RI reporting.

9. A base station, comprising:
a transmit path circuitry configured to:
transmit, to a subscriber station, a control information, wherein a first content of the control information indicates to the subscriber station to select a first feedback mode with single precoding matrix indicator (PMI) reporting and a second content of the control information indicates to the subscriber station to select a second feedback mode with either no PMI reporting or multiple PMI reporting, and
set a pre-coding granularity for the subscriber station based upon the feedback mode indicated by the transmitted control information, wherein the pre-coding granularity is set to multiple physical resource blocks in a frequency domain to perform a substantially same pre-coding over a bundled resource block when the first feedback mode is indicated by the transmitted control information,
wherein the pre-coding granularity is set to one or more physical resource blocks in the frequency domain to perform pre-coding over one or more resource blocks that are not bundled when the second feedback mode is indicated by the transmitted control information, and
wherein the bundled resource block comprises multiple consecutive physical resource blocks in the frequency domain; and
a receive path circuitry configured to receive feedback from the subscriber station.

10. The base station in accordance with claim 9, wherein the transmit path circuitry is further configured to set the pre-coding granularity to one physical resource block when the second feedback mode is indicated by the transmitted control information.

11. The base station in accordance with claim 9, wherein the second feedback mode is with multiple PMI reporting.

12. The base station in accordance with claim 9, wherein the first feedback mode is a wideband channel quality indicator (CQI) feedback mode, and wherein the second feedback mode is a subband CQI feedback mode.

13. A method of operating a base station, the method comprising:
transmitting, to a subscriber station, a control information, wherein a first content of the control information indicates to the subscriber station to select a first feedback mode with single precoding matrix indicator (PMI) reporting and a second content of the control information indicates to the subscriber station to select a second feedback mode with either no PMI reporting or multiple PMI reporting;
setting a pre-coding granularity for the subscriber station based upon the feedback mode indicated by the transmitted control information,
wherein the pre-coding granularity is set to multiple physical resource blocks in a frequency domain to perform a substantially same pre-coding over a bundled resource block when the first feedback mode is indicated by the transmitted control information,
wherein the pre-coding granularity is set to one or more physical resource blocks in the frequency domain to perform pre-coding over one or more resource blocks that are not bundled when the second feedback mode is indicated by the transmitted control information, and
wherein the bundled resource block comprises multiple consecutive physical resource blocks in the frequency domain; and receiving feedback from the subscriber station.

14. The method in accordance with claim 13, further comprising:
setting the pre-coding granularity to one physical resource block when the second feedback mode is indicated by the transmitted control information.

15. The method in accordance with claim 13, wherein the second feedback mode is with multiple PMI reporting.

16. The method in accordance with claim 13, wherein the first feedback mode is a wideband channel quality indicator (CQI) feedback mode, and wherein the second feedback mode is a subband CQI feedback mode.

17. A subscriber station, comprising: a receive path circuitry configured to:
receive, from a base station, a control information, wherein a first content of the control information indicates to the subscriber station to select a first feedback mode with single precoding matrix indicator (PMI) reporting and a second content of the control information indicates to the subscriber station to select a second feedback mode with either no PMI reporting or multiple PMI reporting, and
perform a channel estimation based upon the feedback mode indicated by the transmitted control information,
wherein the channel estimation is performed by the subscriber station over a bundled resource block when the first feedback mode is indicated by the received control information,
wherein the channel estimation is performed by the subscriber station over one or more physical resource blocks that are not bundled when the second feedback mode is indicated by the received control information, and
wherein the bundled resource block comprises multiple consecutive physical resource blocks in the frequency domain; and
a transmit path circuitry configured to transmit the channel estimation as feedback to the base station.

18. The subscriber station in accordance with claim 17, wherein the receive path circuitry is further configured to perform channel estimation only on a per physical resource block basis when the second feedback mode is indicated by the received control information.

19. The subscriber station in accordance with claim 17, wherein the second feedback mode is with multiple PMI reporting.

20. The subscriber station in accordance with claim 17, wherein the first feedback mode is a wideband channel quality indicator (CQI) feedback mode, and wherein the second feedback mode is a subband CQI feedback mode.

21. The base station in accordance with claim 1, wherein the transmitted control information is a transmission format to be used by the subscriber station.

22. A base station comprising:
a transmit path circuitry configured to:
transmit, to a subscriber station, a control information indicating whether the subscriber station will operate during a next downlink with precoding matrix indicator/rank indicator (PMI/RI) reporting or without PMI/RI reporting, and set a pre-coding granularity for the subscriber station based upon whether the subscriber station is configured with PMI/RI reporting, wherein the pre-coding granularity is set to multiple physical resource blocks in a frequency domain to perform a substantially same pre-coding over a bundled resource block if the subscriber station is configured with PMI/RI reporting, wherein the bundled resource block comprises multiple consecutive physical resource blocks in the frequency domain; and a receive path circuitry configured to receive feedback from the subscriber station, wherein the transmitted control information is a feedback format to be used by the subscriber station, and wherein resource block bundling is enabled if the feedback format is configured with PMI/RI reporting, and wherein resource block bundling is not enabled if the transmission format is not configured with PMI/RI reporting.

23. The base station in accordance with claim 1, wherein the transmit path circuitry is configured to set a pre-coding granularity to single physical resource blocks in a frequency domain to perform a pre-coding on a per block basis if the subscriber station is not configured with PMI/RI reporting.

* * * * *